(12) United States Patent
Delaporte et al.

(10) Patent No.: US 10,811,736 B2
(45) Date of Patent: Oct. 20, 2020

(54) PROCESS FOR RECYCLING GRAPHENE FROM AN ELECTRODE MATERIAL

(71) Applicants: HYDRO-QUÉBEC, Montreal, Québec (CA); TRANSFERT PLUS, S.E.C., Montéal, Québec (CA)

(72) Inventors: Nicolas Delaporte, Montréal (CA); Diby Benjamin Ossonon, Montréal (CA); Karim Zaghib, Longueuil (CA); Daniel Belanger, Saint-Hubert (CA)

(73) Assignees: HYDRO-QUEBEC, Montreal, Quebec (CA); TRANSFERT PLUS, S.E.C., Montreal, Quebec (CA)

( * ) Notice: Subject to any disclaimer, the term of this patent is extended or adjusted under 35 U.S.C. 154(b) by 113 days.

(21) Appl. No.: 16/318,826

(22) PCT Filed: Jul. 21, 2017

(86) PCT No.: PCT/CA2017/050880
§ 371 (c)(1),
(2) Date: Jan. 18, 2019

(87) PCT Pub. No.: WO2018/014136
PCT Pub. Date: Jan. 25, 2018

(65) Prior Publication Data
US 2019/0288349 A1   Sep. 19, 2019

Related U.S. Application Data

(60) Provisional application No. 62/365,441, filed on Jul. 22, 2016.

(51) Int. Cl.
*H01M 10/54* (2006.01)
*H01M 4/131* (2010.01)
(Continued)

(52) U.S. Cl.
CPC ............ *H01M 10/54* (2013.01); *H01M 4/131* (2013.01); *H01M 4/136* (2013.01); *H01M 4/625* (2013.01); *Y02W 30/84* (2015.05)

(58) Field of Classification Search
None
See application file for complete search history.

(56) References Cited

U.S. PATENT DOCUMENTS

| 2011/0159372 A1 | 6/2011 | Zhamu et al. |
| 2013/0102084 A1 | 4/2013 | Loh et al. |

FOREIGN PATENT DOCUMENTS

| CA | 2 803 772 A1 | 12/2011 |
| WO | 2011/079238 A1 | 6/2011 |

OTHER PUBLICATIONS

Contestabile, M. et al. "A laboratory-scale lithium-ion battery recycling process" Elsevier, Journal of Power Sources, vol. 92, 2001, pp. 65-69.

(Continued)

*Primary Examiner* — Yoshitoshi Takeuchi
(74) *Attorney, Agent, or Firm* — Buchanan Ingersoll & Rooney P.C.

(57) ABSTRACT

A process for recycling an electrode material comprising graphene and an electrochemically active material is described. The process comprises a step of adding, in any order, water and a non-miscible solvent to the electrode material, thereby forming a biphasic system comprising an organic phase and an aqueous phase; and a step of separating and filtering the organic phase to recover graphene. The process optionally comprises additional steps of washing, drying, and/or thermally treating. Also described are electrodes including the recycled graphene, as well as the electrochemical cells and their uses.

15 Claims, 11 Drawing Sheets

(51) Int. Cl.
*H01M 4/136* (2010.01)
*H01M 4/62* (2006.01)

(56) References Cited

OTHER PUBLICATIONS

Gaines, L. "The future of automotive lithium-ion battery recycling: Charting a sustainable course" Elsevier, Sustainable Materials and Technologies, vol. 1-2, 2014, pp. 2-7.

Belharouak, I. et al. "Synthesis and electrochemical analysis of vapor-deposited carbon-coated LiFePO4" Electrochemistry Communications, vol. 7, 2005, pp. 983-988.

Hamelet, S. et al. "The effects of moderate thermal treatments under air on LiFePO4-based nano powders" Journal of Materials Chemistry, vol. 19, 2009, pp. 3979-3991.

Yuqin, C. et al. "Irreversible capacity loss of graphite electrode in lithium-ion batteries" Elsevier, Journal of Power Sources, vol. 68, 1997, pp. 187-190.

Vargas, O. et al. "Deticiencies of Chemically Reduced Graphene as Electrode in Full Li-Ion Cells" Elsevier, Electrochimica Acta, vol. 165, 2015, pp. 365-371.

Wang, G. et al. "Facile Synthesis and Characterization of Graphene Nanosheets" J. Phys. Chem. C, 2008, vol. 112, pp. 8192-8195.

Guo, H. et al. "A Green Approach to the Synthesis of Graphene Nanosheets" ACSNANO, vol. 3, No. 9. 2009, pp. 2653-2659.

Endo, M. et al. "Recent development of carbon materials for Li ion batteries" Carbon, vol. 38, 2000, pp. 183-197.

Zheng, T. et al. "Reactivity of the Solid Electrolyte Interface on Carbon Electrodes at Elevated Temperatures" Journal of The Electrochemical Society, vol. 146, No. 11, 1999, pp. 4014-4018.

Moradi, B. et al. "Recycling of graphite anodes for the next generation of lithium ion batteries" J Appl Electrochem, (2016),vol. 16, pp. 123-148.

Extended European Search Report dated Mar. 31, 2020, issued by the European Patent Office in corresponding European Application No. 17830159.4-1108, with English-language machine translation (5 pages).

International Search Report (PCT/ISA/210) dated Sep. 25, 2017, by the Office de la propriete intellectuelle du Canada as the International Searching Authority for International Application No. PCT/CA2017/050880.

Written Opinion (PCT/ISA/237) dated Sep. 25, 2017, by the Office de la propriete intellectuelle du Canada as the International Searching Authority for International Application No. PCT/CA2017/050880.

International Search Report (PCT/ISA/210) dated Oct. 11, 2017, by the Canadian Patent Office as the International Searching Authority for International Application No. PCT/CA2017/050881.

Written Opinion (PCT/ISA/237) dated Oct. 11, 2017, by the Canadian Patent Office as the International Searching Authority for International Application No. PCT/CA2017/050881.

Gratz, E. et al., "A Closed Loop Process for Recycling Spent Lithium Ion Batteries", Journal of Power Sources, 262, pp. 255-262, 2014.

Li et al., "Flexible graphene-based lithium ion batteries with ultrafast charge and discharge rates", Proceedings of the National Academy of Sciences of the United States of America, vol. 109, No. 43, pp. 17360-17365, Sep. 17, 2012.

Tanong, K. et al., "Metal Recycling Technologies for Battery Waste", Recent Patents on Engineering, 8, pp. 13-23, 2014.

Zhang, W. et al., "Preparing Graphene from Anode Graphite of Spent Lithium-ion Batteries", Front. Environ. Sci. Eng., 11(5): 6, pp. 1-8, 2017.

Zhou et al., "A flexible sulfur-graphene-polypropylene separator integrated electrode for advanced Li—S batteries", Advanced Materials, 27, pp. 641-647, Jan. 27, 2015.

PROCESS FOR RECYCLING GRAPHENE FROM AN ELECTRODE MATERIAL

RELATED APPLICATION

This application claims priority under the applicable law to U.S. provisional application No. 62/365,441 filed on Jul. 22, 2016, the content of which is incorporated herein by reference in its entirety and for all purposes.

TECHNICAL FIELD

The technical field generally relates to processes for recycling graphene from electrode materials, for example, a process for recycling graphene from an electrode comprising graphene and an electrochemically active material used in Li-ion batteries. The present technology also relates to the use of the graphene thus recycled in the preparation of electrodes used in electrochemical cells.

BACKGROUND

Graphene is known to be an expensive material, and conventional methods to recycle the graphene from Li-ion batteries use solvents such as N-methyl-2-pyrrolidone (NMP) to solubilize the binder (for example PVDF) and separate the graphene film from the current collector. This solubilization step is generally followed by a thermal treatment (see Contestabile et al., J. Power Sources, 2001, 92, pages 65-69). Harmful solvents or strong acids or bases may also be used in such conventional methods. Also, industrial methods for the recycling of current collector materials, such as aluminum, are neither economical nor energy efficient (Gaines L., Sustainable Material and Technologies, 2001, 1-2, pages 2-7).

There is therefore a need for new methods for the recycling of graphene from electrode material comprising graphene and an electrochemically active material, avoiding at least one of the drawbacks of the currently used processes. For example, such a new method would include simplified steps, use environmentally friendly solvents and/or involve lower energy consumption.

SUMMARY

The present technology relates to a process for recycling an electrode material including graphene and an electrochemically active material, the process including the steps of:
  (i) adding, in any order, water and a non-miscible solvent to the electrode material, thereby forming a biphasic system including an organic phase and an aqueous phase;
  (ii) separating the organic and aqueous phases; and
  (iii) filtering the organic phase to recover the graphene.

In one embodiment, the process further includes, before step (i), a step of washing the electrode material using a solvent to obtain a suspension of graphene and electrochemically active material, and a step of filtering said suspension. For example, the washing step further includes treating the suspension in an ultrasonic bath. The filtrate obtained from the filtration of the suspension may further include an additional washing step using a solvent, for example, the same solvent as the one used for the washing step.

In one embodiment, the process further includes, before step (i), a thermal treatment step carried out at a temperature of between about 400° C. and about 550° C. for at least 20 minutes, for example, at a temperature of about 500° C. and for a period of time of between 20 and 60 minutes. In another embodiment, the process further includes a pre-drying step before the thermal treatment step.

In another embodiment, the non-miscible solvent used in the biphasic system of the process herein defined is a carbonate ester, for example, diethyl carbonate, dimethyl carbonate or ethyl methyl carbonate. In the biphasic system, the water/non-miscible solvent ratio may range between about 3:1 and about 1:2, or between about 2:1 and about 1:1. After the separation of the two phases from the biphasic system, the organic phase is optionally washed with deionized water in order to remove remaining traces of the electrochemically active material. The process further includes an optional step of recovering the aqueous phase and regenerating the electrochemically active material.

In a further embodiment, the electrochemically active material present in the electrode material is selected from $TiO_2$, $Li_2TiO_3$, $Li_4Ti_5O_{12}$, $H_2Ti_5O_{11}$, $H_2Ti_4O_9$, or a combination thereof, $LiM'PO_4$ wherein M' is Fe, Ni, Mn, Co, or a combination thereof, $LiV_3O_8$, $V_2O_5$, $LiMn_2O_4$, $LiM''O_2$, wherein M'' is Mn, Co, Ni, or a combination thereof, $Li(NiM''')O_2$, wherein M''' is Mn, Co, Al, Fe, Cr, Ti, or Zr, and combinations thereof. According to one example, the electrochemically active material present in the electrode material is a lithium titanate or a lithium metal phosphate, for instance, $Li_4Ti_5O_{12}$, $LiFePO_4$, or carbon-coated $LiFePO_4$.

DETAILED DESCRIPTION

In this document, the term "about" when followed by a measurement or a numerical value means within the acceptable limits of the experimental error as determined by the person skilled in the art, which will depend in part on the how the numerical value is measured or calculated, i.e. according to the limits of the measuring equipment. This value will also take into account the number of significant digits expressed and the rounding of the numerical values. In the alternative, unless otherwise indicated, when the term "about" is used in the present specification or claims, it means that a margin of error must be assumed, for example more or less 10%, or more or less 5%, or more or less 1%, of the described value.

Figure 1:
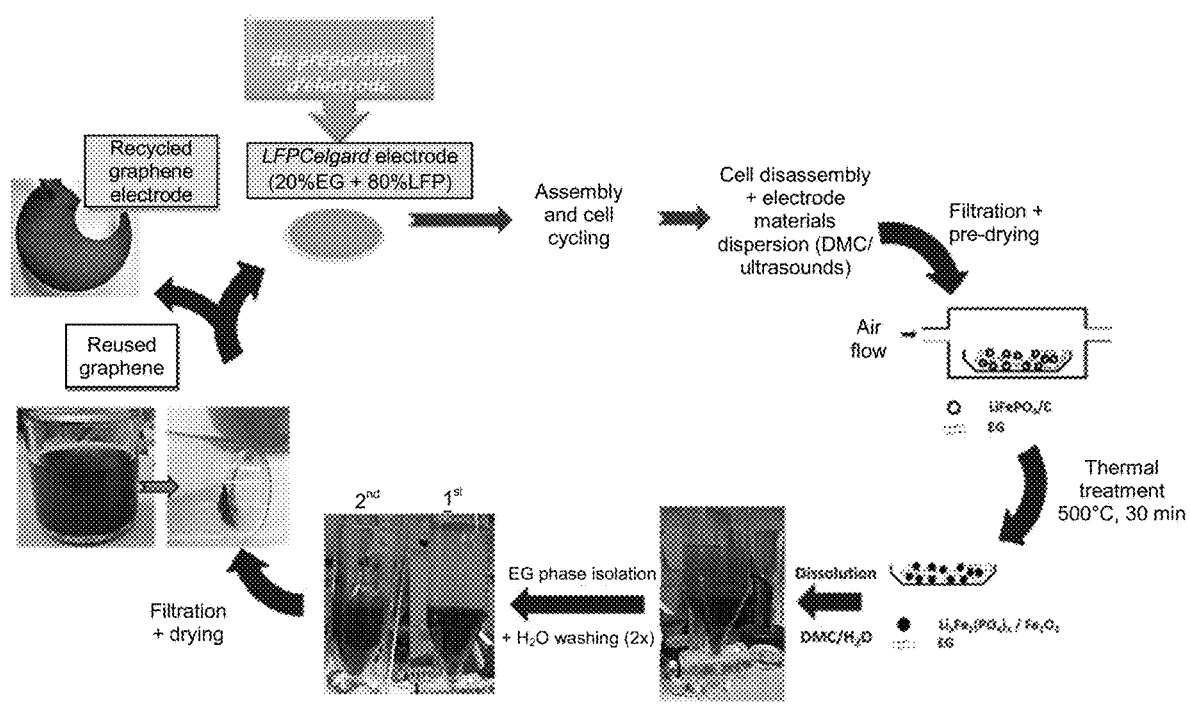
FIG. 1 is a schematic illustration of the method for recycling graphene-based electrodes according to one embodiment of the present technology.

The more widespread use of graphene is still limited by its high price. Therefore, a recycling process to recover the graphene contained in a used battery has been developed. This process, an embodiment of which is illustrated in FIG. 1, is simple, uses green solvents, and avoids the use of large quantity of NMP to solubilize the binder and to separate the various components and materials of the battery. In addition, only a short thermal treatment under ambient air may be required for carbon-coated electrochemically active material particles.

According to a first aspect, this technology relates to a process for recycling an electrode material comprising graphene and, optionally, an electrochemically active material. The present process may be applied, for example, when the electrode material does not include a polymeric binder such as PVDF.

In one embodiment, the process comprises a step which consists in adding, in any order, water and a non-miscible solvent to the electrode material. "Non-miscible solvent" here means an organic solvent non-miscible in water in the proportions and conditions of use (for example, at room temperature). The addition of water and of non-miscible solvent leads to the formation of a two-phase system comprising an organic phase and an aqueous phase. The graphene is then present in the organic phase, while the electrochemically active material is found in the aqueous phase.

The non-miscible solvent may be a carbonate ester such as diethyl carbonate, dimethyl carbonate or ethyl methyl carbonate. The solvent is used in proportions that allow the production of a biphasic system. For example, the biphasic system may contain water and the non-miscible solvent in a ratio ranging from about 3:1 to about 1:2, limits included. In a preferred embodiment, the solvent is dimethyl carbonate and the water/solvent ratio is from about 2:1 to about 1:1, or of about 2:1.

In one embodiment, the electrochemically active material comprises a material selected from the group consisting of titanates, lithium titanates, lithium metal phosphates, vanadium oxides, lithium metal oxides, and combinations thereof when relevant. For example, the electrochemically active material may be selected from $TiO_2$, $Li_2TiO_3$, $Li_4Ti_5O_{12}$, $H_2Ti_5O_{11}$ and $H_2Ti_4O_9$, or a combination thereof, $LiM'PO_4$ wherein M' is Fe, Ni, Mn, Co, or a combination thereof, $LiV_3O_8$, $V_2O_5$, $LiMn_2O_4$, $LiM"O_2$, wherein M" is Mn, Co, Ni, or a combination thereof, $Li(NiM''')O_2$, wherein M''' is Mn, Co, Al, Fe, Cr, Ti, or Zr, and combinations thereof.

According to one example, the electrochemically active material is selected from lithium titanates and lithium metal phosphates, for example, $Li_4Ti_5O_{12}$ or $LiFePO_4$.

The recycling process may further comprise a step of separating the organic phase from the aqueous phase. The graphene is thus recovered from the electrode material using a liquid-liquid extraction. The organic phase comprising the graphene may be further washed with deionized water in order to remove remaining traces of the electrochemically active material. The obtained organic phase is then filtered to recover the graphene. The graphene recovered using the present recycling process may then be used in the manufacture of electrode materials. The aqueous phase may also be recovered, and the electrochemically active material may be regenerated for possible use in the manufacture of electrode materials.

The electrochemically active material particles present in the electrode material to be recycled may also be carbon-coated. For example, the electrochemically active material may be a carbon-coated lithium metal phosphate ($LiM'PO_4$ as defined herein) such as carbon-coated $LiFePO_4$ (referred to as $LiFePO_4/C$ hereinafter). In the case where the electrochemically active material is carbon-coated, the process for recycling graphene from the electrode material may comprise additional steps before the addition of water and a non-miscible solvent (biphasic treatment).

In an embodiment, the process comprises a step of washing the electrode material using a solvent, thereby recovering a mixture of graphene and electrochemically active material. The solvent may be a carbonate ester such as diethyl carbonate, dimethyl carbonate or ethyl methyl carbonate. For example, the electrode material may be mixed with the solvent and treated in an ultrasonic bath.

In one embodiment, the mixture comprising the graphene and the electrochemically active material resulting from the previous washing step is filtered to remove the solvent and recover a powder comprising the graphene and the electrochemically active material. The filtered powder may be further washed with a solvent in order to remove a salt excess or any other soluble impurities. The solvent may be the same solvent as the one used in the previous washing step, or any other suitable solvent known to the person skilled in the art.

In one embodiment, the powder is further thermally treated. The thermal treatment may be achieved at a temperature of between about 400° C. and about 550° C., limits included, and last for at least 20 minutes. For example, the temperature of the thermal treatment is of about 500° C. The thermal treatment may last for a period of time of between 20 and 60 minutes. Such a thermal treatment allows for the removal of the coating from the carbon-coated electrochemically active material particles and/or enables the oxidation of the electrochemically active material.

In an embodiment, a pre-drying step may be carried out before thermally treating the powder. For example, the graphene and electrochemically active material powder may be pre-dried by air flow or any other known techniques.

In one embodiment, the step of adding water and a non-miscible solvent to the graphene and electrochemically active material powder, and the step of separating and filtering the organic phase, as described above, are performed after the thermal treatment step.

EXAMPLES

The following non-limiting examples are illustrative embodiments and should not be construed as limiting the scope of the present invention. These examples will be better understood with reference to the accompanying figures.

Example 1—Preparation of Graphene-Based Electrode and Electrochemical Cell a) Electrochemical Exfoliation of Graphite Foil Graphene powder has been obtained by electrochemical exfoliation of a graphite foil (Alfa Aesar, 7.5 cm×2 cm×0.05 cm) (see Canadian patent application No. 2,803,772). For example, the graphite foil is used as the anode (connected to the positive terminal of a direct current power supply). The counter-electrode then consists in a platinum mesh (4 cm$^2$). Both the graphite foil and the counter-electrode are immersed in a 0.1 M $H_2SO_4$ electrolytic solution and are separated by a constant distance of 4 cm. Electrochemical exfoliation was performed by applying a 6, 8 or 10 V DC voltage between the two electrodes. After about 1 hour of electrolysis, the solution containing the exfoliated graphene was vacuum filtered using a Buchner-type assembly and a polytetrafluoroethylene (PTFE) membrane filter with a pore size of 0.47 µm. The resulting exfoliated graphene powder, named EG in the Figures of the present description, was then washed several times with Nanopure® water to remove the residual acid before being dispersed in dimethylformamide (DMF) by ultrasonication for 10 minutes. The dispersion was collected, and the resulting material was treated for 1 hour at 1000° C. under 5% hydrogenated argon and then used for making both the anode and the cathode as described below.

b) Preparation of Self-Standing Graphene Electrodes

For the preparation of self-standing graphene electrodes, a measured quantity of the exfoliated graphene powder from step a), selected to obtain a concentration comprised between 100 and 400 mg/L, was dispersed in 50 mL of DMF and put in an ultrasonic bath for 30 minutes. Regular (or "fresh") and recycled graphene were both used. The resulting mixture was then filtered on a Nylon® filter for several hours. When sufficiently dry, the graphene layer was removed from the filter and further dried at 80° C. under vacuum for 24 hours. The layer of graphene was then thermally treated in a tubular furnace at 1000° C. for 2 hours under 5% hydrogenated argon, and used as electrode, without additive, binder or current collector.

c) Preparation of Electrochemical Cells

The various graphene electrodes were characterized in two-electrode coin cells with metallic lithium as negative electrode, a Celgard®-2320 separator impregnated with a 1 M $LiPF_6$ electrolyte in a mixture of ethylene carbonate (EC)/diethyl carbonate (DEC)/dimethyl carbonate (DMC) (1:1:1 by vol.), and exfoliated graphene or 100% recycled exfoliated graphene as positive electrode. The cells were assembled in a dry argon-filled glove-box. The cells were controlled with a VMP3™ potentiostat and the charge/discharge cycling procedure was performed in galvanostatic mode between 0.01 to 1.5 V versus $Li/Li^+$ at different current densities, after 1 hour of rest at open circuit voltage (OCV). For each current density ranging from 50 mA/g to 1 A/g, 10 cycles were recorded.

Example 2—Recycling of Li-Ion Batteries and Recovery of Graphene a) Recycling of Graphene/LFP Electrodes As illustrated in FIG. 1, LFP electrodes comprising graphene and an electrochemically active material (LFPcelgard) were made according to the method of Example 1 where no binder or current collector were used, and where the electrode materials comprising graphene and electrochemically active material were filtered on a polymer separator to form a layer of electrode material acting as the electrode. The graphene and electrochemically active material ($LiFePO_4$/C), used in a graphene/$LiFePO_4$ ratio of 20:80, were recovered by washing the various components with dimethyl carbonate (DMC) in an ultrasonic bath. The mixture was filtered and washed again with DMC to remove excess salt. After a short pre-drying, the resulting powder, composed of $LiFePO_4$/C and graphene, was thermally treated at 500° C. for 30 minutes to remove the carbon coating and to oxidize the $LiFePO_4$ particles. After this step, the graphene was separated from the $LiFePO_4$/C oxidation and degradation products by dispersion in a water/DMC (2:1 volume ratio) mixture. The organic phase contained most of the graphene. The aqueous phase (on top) was orange, which confirmed the presence of oxidized species like $Li_3Fe_2(PO_4)_3$ and $Fe_2O_3$. Then, the organic phase was separated and washed twice with deionized water to remove residual traces of oxidized products.

Finally, the DMC phase was filtered, and the recycled graphene powder was obtained with a yield of about 80%.

b) Recycling of Graphene/LTO Electrodes

Figure 2:
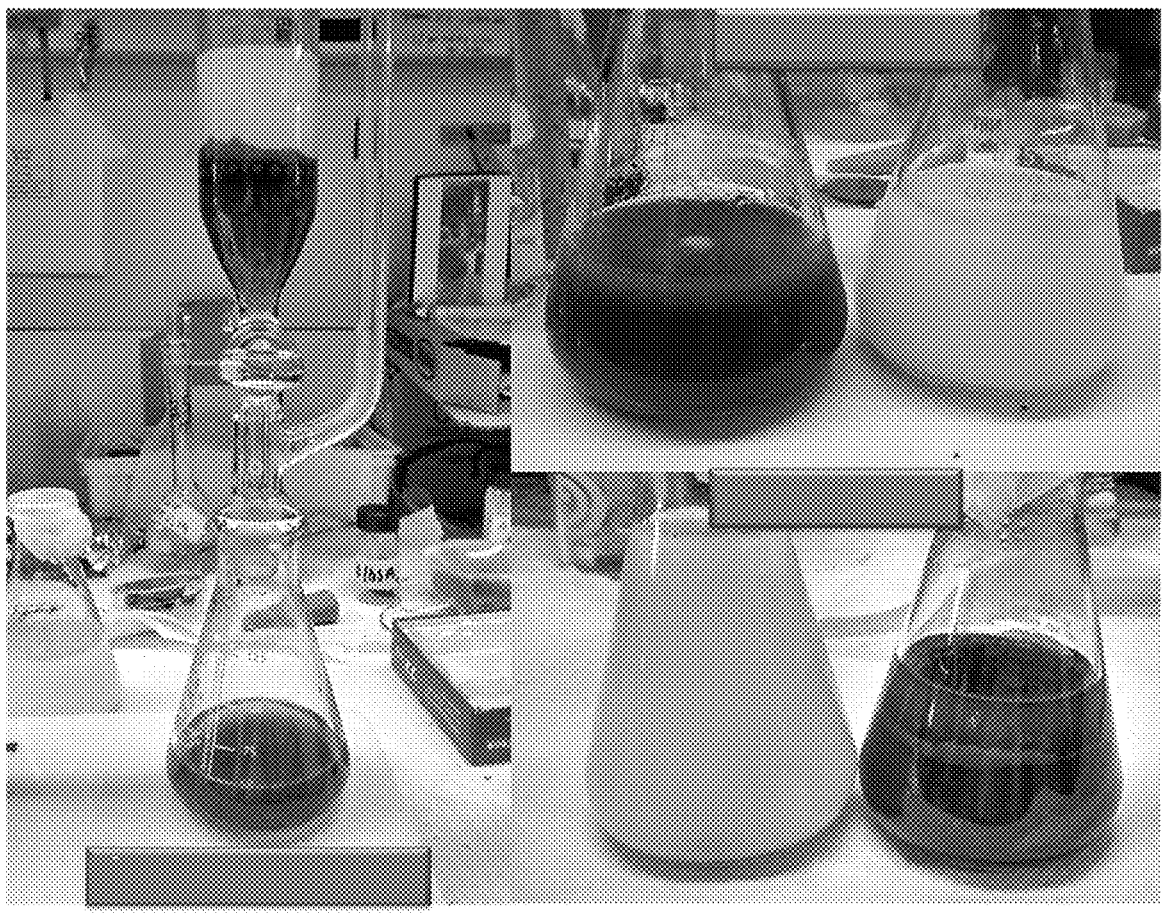
FIG. 2 is a photograph showing the separation of graphene from a LTO powder according to one embodiment.

LTO active material particles present in the electrode material were not coated beforehand with a carbon layer. Therefore, as illustrated in the image of FIG. 2, no thermal treatment was necessary. The electrochemically active material ($Li_4Ti_5O_{12}$ and graphene) was thus dispersed in DMC, filtered and washed with DMC to remove remaining lithium salts. The obtained power was then suspended in deionized water and DMC. More specifically, the LTO (present in the aqueous phase) was separated from graphene (present in the organic phase). The organic phase was washed twice with deionized water, to obtain a graphene-rich organic phase and an aqueous phase containing LTO. The phases were separated, and the graphene powder has been isolated by filtration.

Example 3—Characterization of Electrodes and Graphene Material a) Thermogravimetric Analysis The thermal stability of regular graphene and recycled graphene powders was evaluated by thermogravimetric analysis (TGA) performed under a constant airflow rate of 90 mL/min at a temperature of from 30 to 1000° C. and a heating rate of 10° C./min, using TGA (Q500™)/Discovery MS™ instruments.

Figure 3:
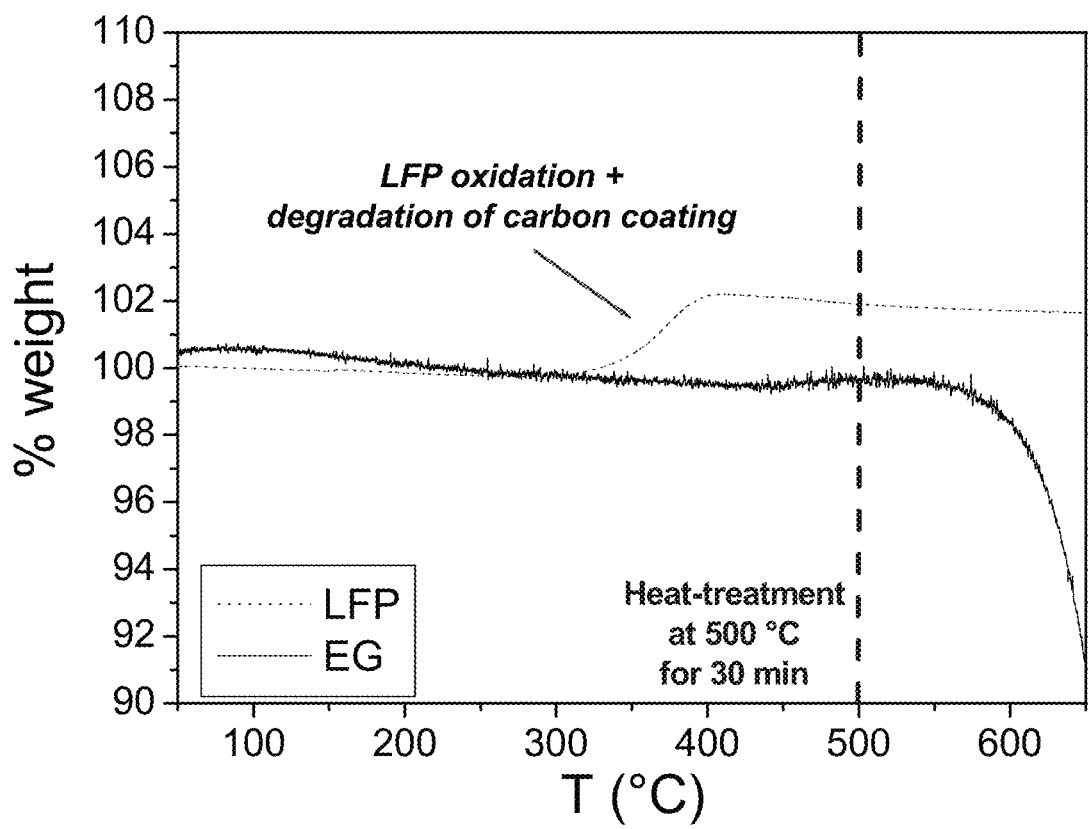
FIG. 3 shows thermogravimetric curves of a $LiFePO_4/C$ (LFP) powder and a graphene (EG) powder.

The thermogravimetric curves of the $LiFePO_4$/C and graphene powders are shown in FIG. 3. Some notable differences are observed between the two materials above 300° C. First, graphene remained stable until about 550° C., at which temperature an onset of combustion was observed. On the other hand, a weight gain of approximately 2.3% was observed between 300 and 400° C. for the $LiFePO_4$/C powder. It is possible that this weight gain is the result of the $LiFePO_4$/C oxidation to form $Li_3Fe_2(PO_4)_3$ and $Fe_2O_3$, this oxidation being also accompanied by the carbon coating degradation (Belharouak et al., *Electrochem. Commun.*, 2005, 7, 983-988; Hamelet et al., *J. Mater. Chem.*, 2009, 19, 3979-3991). A temperature of 500° C. was thus selected for the thermal treatment in Example 2 of the graphene and $LiFePO_4$/C mixture recovered after a first washing step. The $LiFePO_4$/C oxidation products were then separated from the graphene sheets in a subsequent step. A yield of about 80% was obtained based on the weight of graphene used in the various batteries and the weight of graphene recovered at the end of the process.

Figure 4:
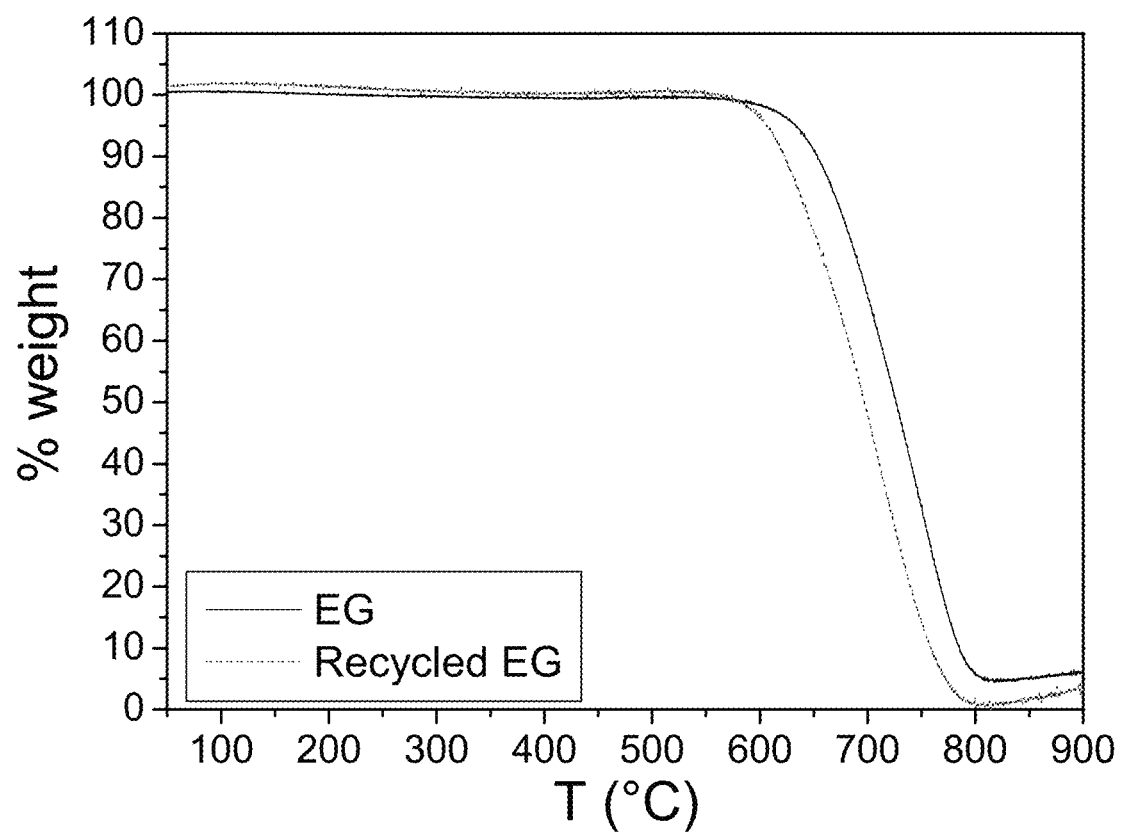
FIG. 4 shows thermogravimetric curves of a graphene powder before (EG) and after (recycled EG) applying the recycling method according to one embodiment.

To validate the recycling process efficiency, the recycled graphene powder was also characterized by thermogravimetric analysis. FIG. 4 shows the thermogravimetric curves for the graphene powder before (curve named "EG" in FIG. 4) and after recycling (curve named "recycled EG" in FIG. 4). It appears that both curves are similar and that the only difference observed is that the onset of the combustion of the recycled graphene powder is occurring at a slightly lower temperature (about 25° C. lower) compared to fresh graphene. This behavior could be explained by a difference in the graphene sheets' size. Indeed, the additional heat and ultrasonic treatments may have led to a recycled graphene powder composed of smaller particles.

b) X-Ray Diffraction Analysis

Graphene from LFP electrodes was recovered by the present recycling process, and a thin oxide film was also obtained. The oxide, regular graphene and recycled graphene films were characterized by X-ray diffraction (XRD) using a Philips X'Pert™ diffractometer θ-2θ with Cu K$\alpha_1$, $\alpha_2$ radiation ($\lambda_1$=1.5405 Å, $\lambda_2$=1.5443 Å) and a monochromator to avoid the presence of $K_\beta$ radiation. Both films have been laid on a monocrystalline Si (400) plate (single peak at 2θ=69). The data have been collected between 5° and 60° using 0.02° increments and an integration time of 1.3 s per increment with an X'Celerator™ detector.

A 100% recycled graphene layer was formed on a Celgard® separator. An oxide layer was also prepared on another Celgard® separator by filtration of the aqueous solution containing the oxidized species. These graphene and oxide layers were characterized by X-ray diffraction (XRD), as shown in FIG. 5.

Figure 5:
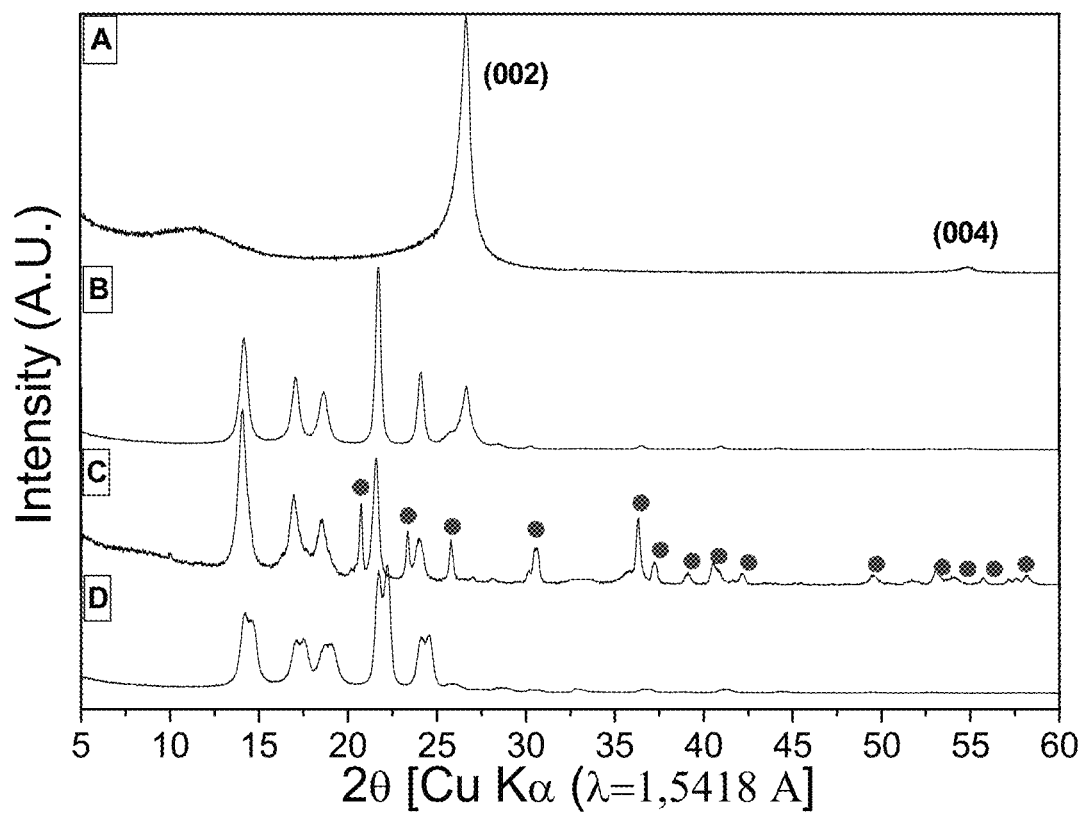
FIG. 5 shows X-ray diffraction patterns of a) a self-standing graphene layer, b) a layer of recycled graphene according to one embodiment on a Celgard® separator, c) an oxide layer on a Celgard® separator, and d) a Celgard® separator alone. The peaks assigned to the oxide particles are identified by circles (●).

The XRD patterns of a self-standing graphene layer and a Celgard® separator alone are also presented in FIG. 5. FIG. 5a shows an asymmetric sharp peak around 2θ=27° for the self-standing graphene layer, which was assigned to the (002) plane of a graphitic material. Moreover, a low intensity peak at around 2θ=55°, generally observed for graphene powders, is also present (Yuqin et al., *J. Power Sources*, 1997, 68, 187-190). Finally, the broad peak at about 2θ=10-15° is assigned to a graphite oxide material generated during the electrochemical exfoliation of a graphite foil (Vargas et al., *Electrochim. Acta*, 2015, 165, 365-371; Wang et al., *J. Phys. Chem. C*, 2008, 112, 8192-8195; Guo et al., *ACS nano*, 2009, 3, 2653-2659).

In FIG. 5d, the XRD pattern of the Celgard® separator alone shows five peaks between 12 and 27°. For the oxide film, in addition to the five peaks of the Celgard® support, several small peaks were observed between 20 and 27° and identified by circles in FIG. 5c. For the recycled graphene layer (FIG. 5b), the XRD pattern is consistent with the presence of Celgard® and graphene and the absence of oxides. These results confirm the effectiveness of the recycling process as described herein.

c) Scanning Electron Microscopy

Morphological studies of different electrode films were performed using a scanning electron microscope JEOL JSM-7600F™ equipped with an Oxford Instruments X-Max 80™ EDS detector.

Figure 6:
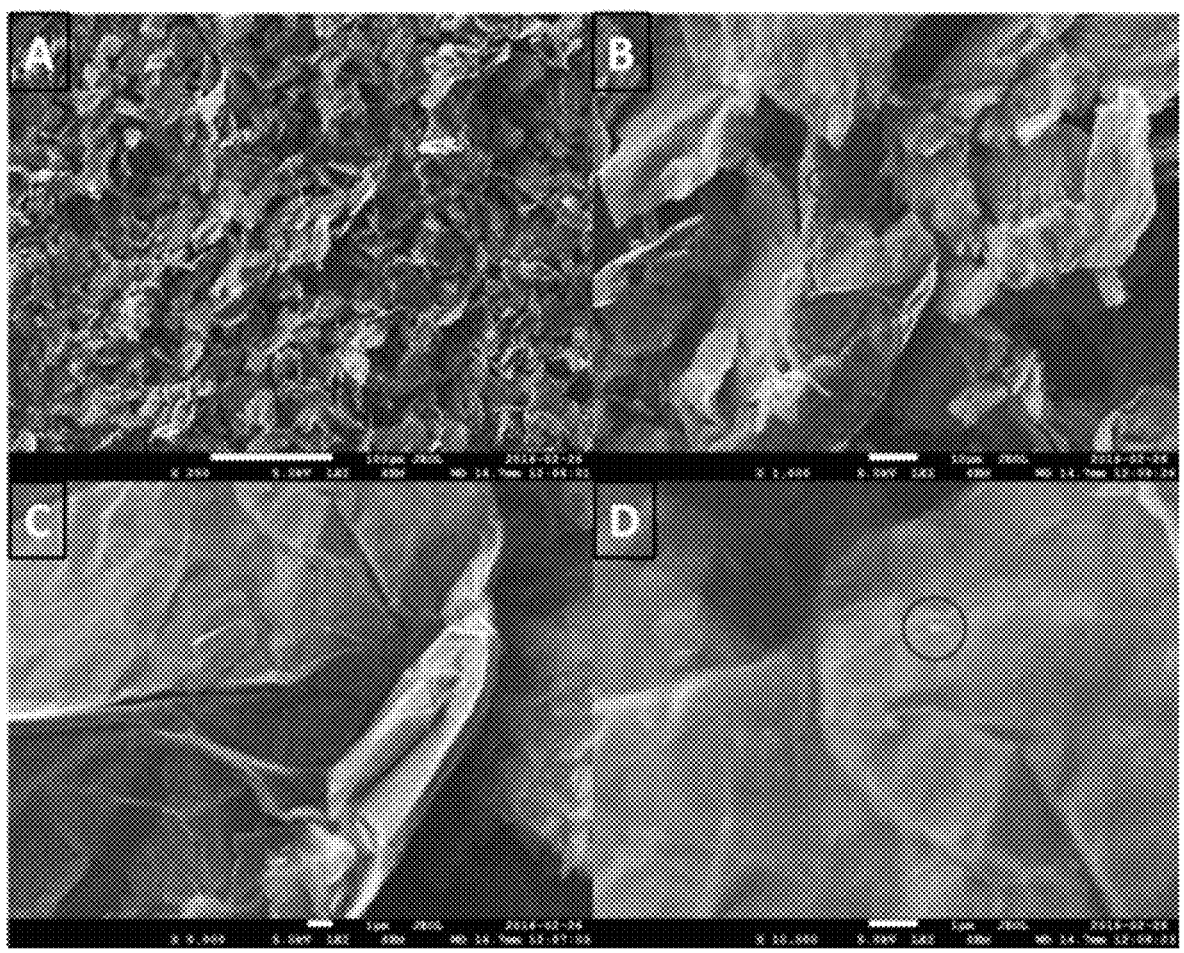
FIG. 6 shows Scanning Electron Microscopy (SEM) images of the recycled graphene layer according to one embodiment and obtained at: a) 250×, b) 1000×, c) 5000× and d) 10000×. The circles indicate possible residual oxide particles.
Figure 10:
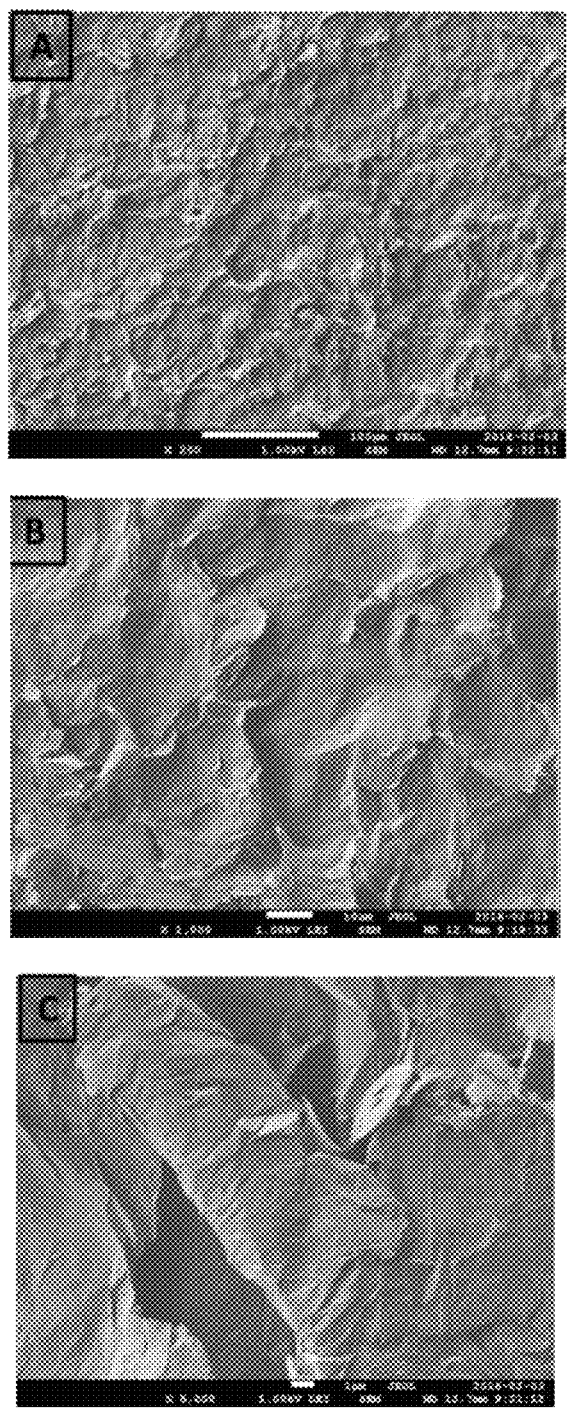
FIG. 10 shows SEM images of a self-standing graphene layer obtained at a) 250×, b) 1000× and c) 5000×.

The recycled graphene layer was also characterized by scanning electron microscopy (SEM). The SEM images are presented in FIG. 6 with different magnifications. For comparison purposes, the SEM images of a self-standing layer with fresh graphene are also presented in FIG. 10 and show an assembly of graphene sheets of several micrometers. The texture and size of the recycled graphene sheets are different from that observed for a self-standing graphene film presented in FIG. 10. This result is also in agreement with the thermogravimetric analysis which showed a slightly lower combustion temperature for the recycled graphene powder. This result corroborates the hypothesis that this effect may be due to a difference in size of the graphene sheets resulting from the additional thermal and ultrasonic treatments. In addition, there is no clear evidence of the presence of residual oxide particles in the film. Small and irregular particles, identified with circles in FIG. 6, were observed but could not be attributed to the presence of oxide.

Figure 7:
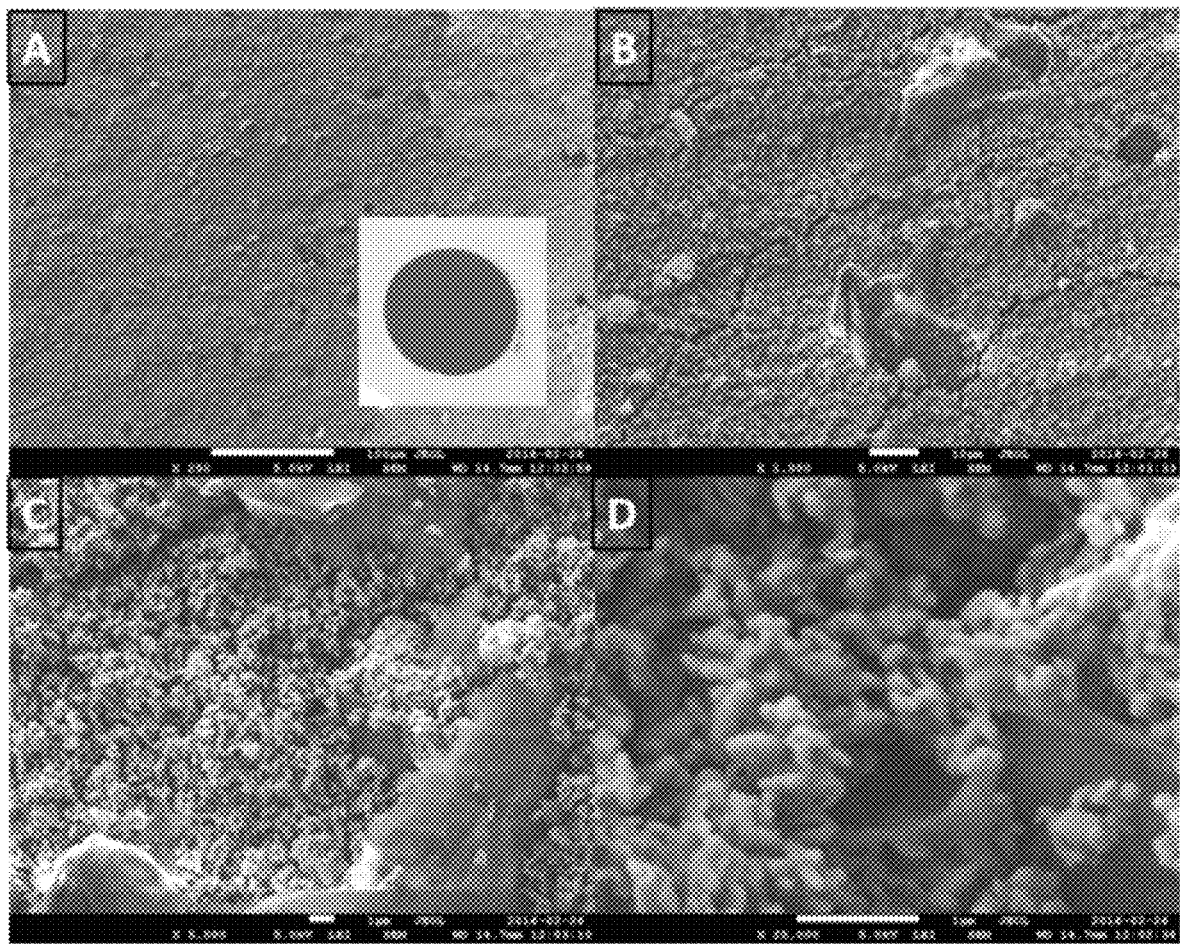
FIG. 7 shows SEM images of the oxide film deposited on a Celgard® separator, obtained at: a) 250×, b) 1000×, c) 5000× and d) 10000×. An optical photograph of the oxide film is also provided.

The oxide layer was been characterized by scanning electron microscopy. FIG. 7 presents SEM images at different magnifications. Although not shown here in the black and white version, the inset image of the separator in FIG. 7a shows an orange color for the filtered powder, suggesting that the $LiFePO_4$/C material was completely oxidized during the thermal treatment at 500° C. These observations show that the separation and washing steps with deionized water, described in FIG. 1, allowed for an efficient separation of graphene from the oxide powder.

Figure 8:
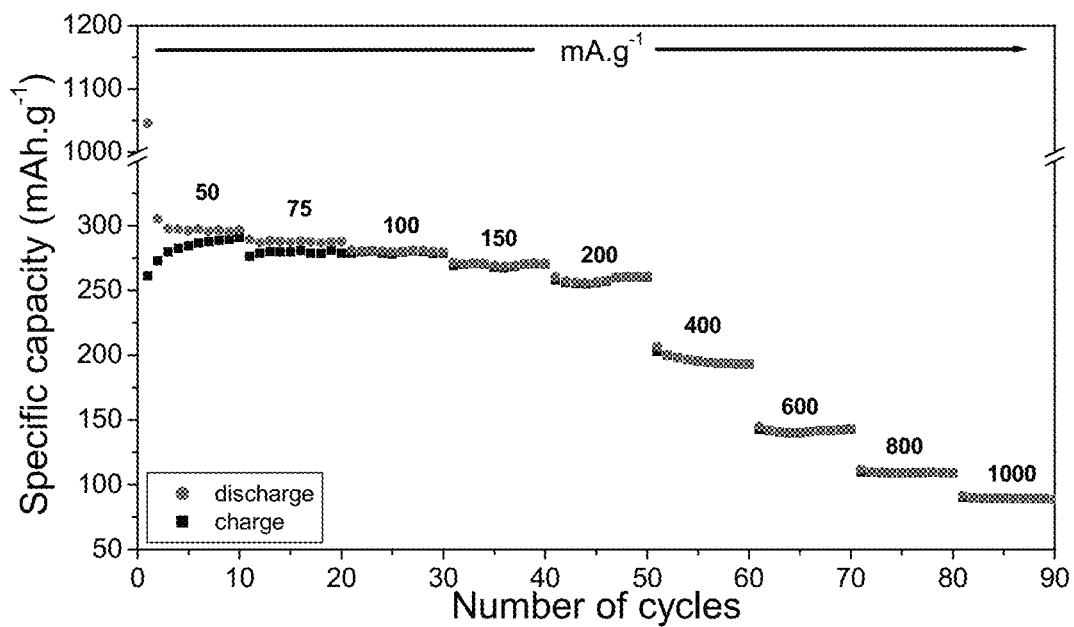
FIG. 8 shows the specific charge (squares) and discharge (circles) capacities of a self-standing graphene electrode cycled at rates ranging from 50 to 1000 mA/g.

Example 4—Electrochemical Performance of Electrodes Comprising Exfoliated Graphene and Recycled Exfoliated Graphene The electrochemical performances of self-standing graphene electrodes were evaluated in coin-cells with lithium metal as counter-electrode. The regular (fresh) graphene powder was also used to prepare a self-standing graphene film, which was used as electrode in a Li-ion battery without addition of a current collector, binder or carbon additive. The charge and discharge specific capacities of a self-standing graphene electrode are presented in FIG. 8. A discharge capacity of approximately 250-275 mAh/g was obtained for applied currents between 50 and 200 mA/g. The capacity decreased continuously while the cycling rate was increased. At high rate, the discharge capacity appeared to stabilize, and an average capacity of 85 mAh/g was obtained at 1 A/g.

Figure 11:
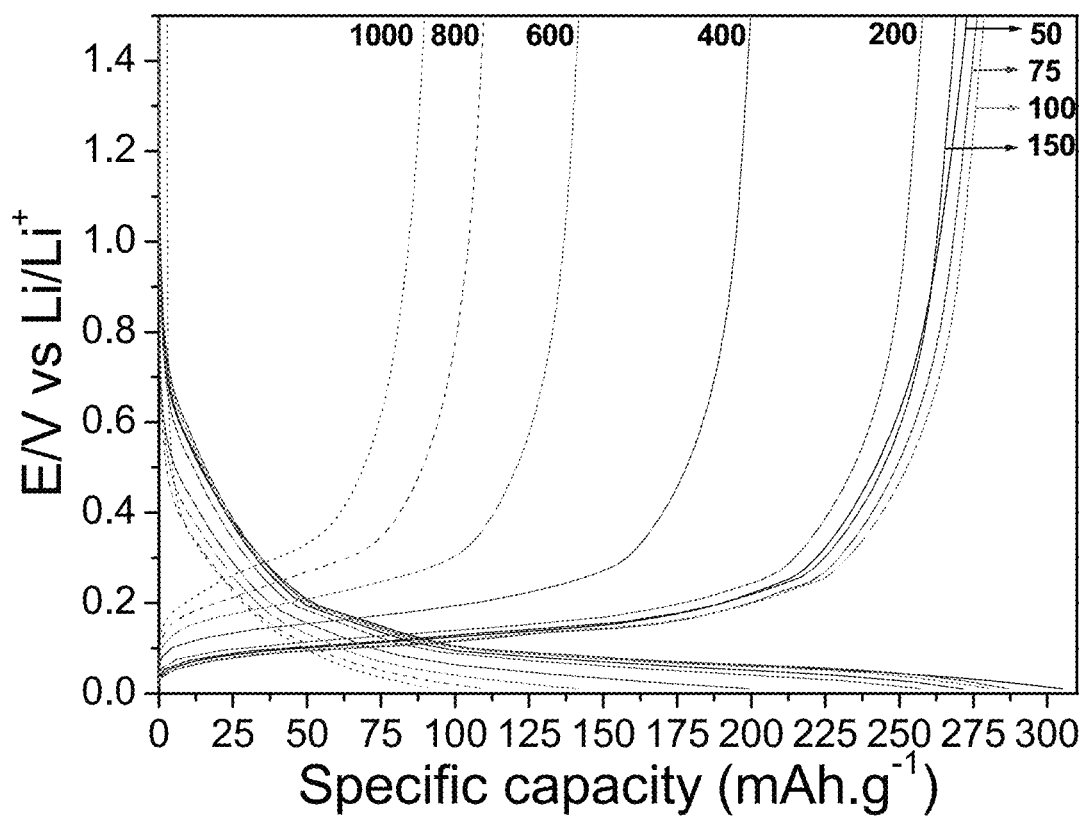
FIG. 11 shows charge/discharge profiles at rates ranging from 50 to 1000 mA/g for a self-standing graphene electrode, where the second cycle for each current density is represented.

FIG. 11 illustrates the charge and discharge profiles for the self-standing graphene electrode cycled at different current densities ranging from 50 to 1000 mA/g. The curves display the voltage profiles typically observed for graphite electrodes (Endo et al., *Carbon*, 2000, 38, 183-197). At low current densities (between 50 and 200 mA/g), the curves were very similar without significant increase in polarization. The charge voltage increased considerably with the increase in cycling rate due to higher resistance and polarization. As a result, the specific capacities recovered at high charge and discharge currents were smaller.

Figure 9:
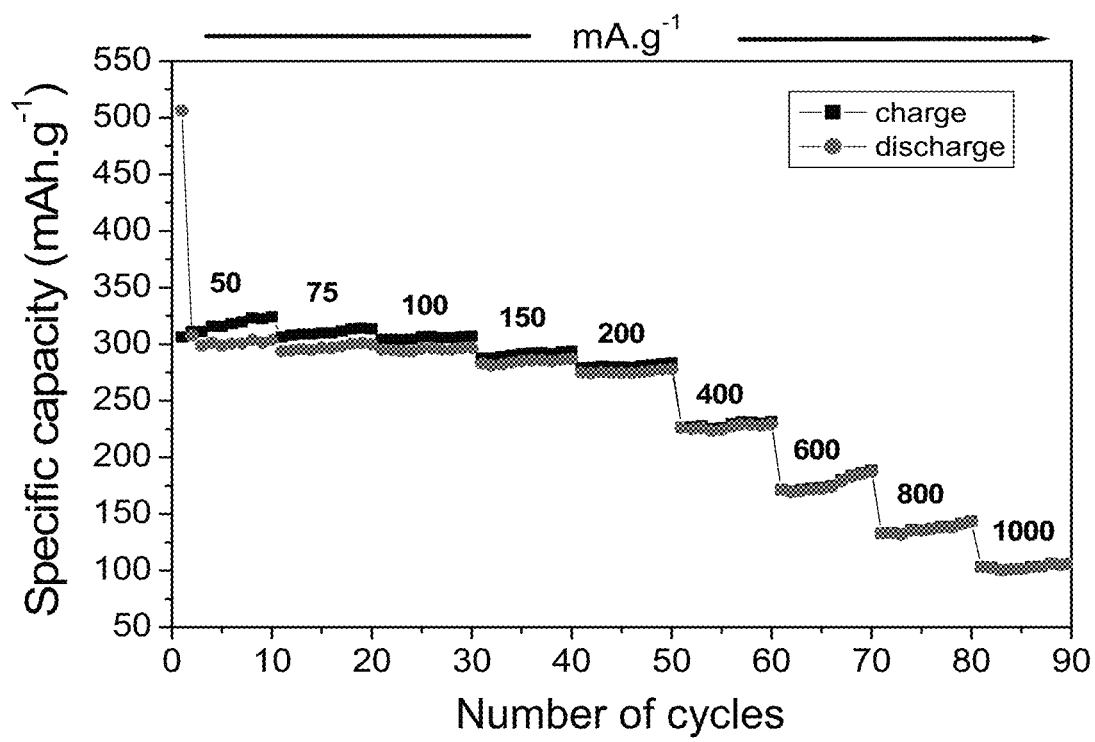
FIG. 9 shows the specific charge (squares) and discharge (circles) capacities of a recycled graphene anode cycled at rates ranging from 50 to 1000 mA/g.

An electrode prepared with recycled graphene obtained by the recycling process as defined herein was also tested in a coin-cell. The specific charge and discharge capacities of the recycled graphene film electrode are shown in FIG. 9. The electrochemical performances were similar those obtained for the self-standing graphene electrode presented in FIG. 8. Interestingly, the irreversible capacity during the first charge/discharge cycle was smaller after recycling, presumably due to the additional heat treatments and also to the different particle morphology (Zheng et al., *J. Electrochem. Soc.*, 1999, 146, 4014-4018). In addition, current densities greater than 200 mA/g, resulted in slightly higher specific capacities after recycling. This enhancement may be explained by the smaller graphene sheets after recycling, thus facilitating the lithium storage at high current densities.

When prepared by the process of Example 1, the electrodes comprising graphene for use in Li-ion batteries were produced without current collector, binder and harmful solvents normally used to prepare the electrode compositions. A graphene powder, obtained by electrochemical exfoliation of graphite foil, was used as additive to an active material (LiFePO$_4$/C or Li$_4$Ti$_5$O$_{12}$) for the manufacturing of Li-ion battery electrodes.

The electrode material comprising graphene and an electrochemically active material was then recycled to recover the graphene by the process described herein. One of the main advantages of this green and rapid process is that NMP and/or strong acid/base treatments are not needed to recover the transition metals or graphene. Only a carbonate ester solvent (such as dimethyl carbonate) and water may be used for the washing and separating steps. An aqueous phase containing the electrochemically active material, or its oxidized version are obtained and may be treated to regenerate the electrochemically active material for further use in the manufacture of batteries. In addition, the recycled graphene powder was isolated with a yield of at least 80%. This yield could also be further optimized. The recovered graphene may also be subsequently used for manufacturing new batteries. A simple and low-energy recycling process was developed in order to reuse the graphene present in used lithium or lithium-ion batteries.

When the electrochemically active material is not coated with carbon, the heat treatment is avoided, considerably reducing the process costs. Finally, with the present simple and environmentally-friendly process, a graphene powder can be recovered as well as the electrode active material, and eventually be reused in the manufacture of composite electrodes.

The performance of the recycled graphene electrode were also demonstrated to be at least similar to that of the film made with electrochemically exfoliated graphene. These results have also shown that the recycling of graphene using the present process allows for the recovery of a major part of the electrode's graphene, as well as the preservation of the graphene's electrochemical properties. This could promote the use of graphene in Li-ion batteries.

Numerous modifications could be made to any of the embodiments described above without departing from the scope of the present invention. Any references, patents, or scientific literature documents referred to in the present document are incorporated herein by reference in their entirety for all purposes.

The invention claimed is:

1. A process for recycling an electrode material comprising graphene and an electrochemically active material, the process comprising the steps of:
   (1) adding, in any order, water and a non-miscible solvent to the electrode material, thereby forming a biphasic system comprising an organic phase as an organic layer and an aqueous phase as an aqueous layer;
   (2) separating the organic layer and the aqueous phase; and
   (3) filtering the organic phase to recover graphene.

2. The process of claim 1, wherein the non-miscible solvent is a carbonate ester.

3. The process of claim 2, wherein the carbonate ester is diethyl carbonate, dimethyl carbonate, ethyl methyl carbonate or a mixture of at least two thereof.

4. The process of claim 1, wherein the biphasic system has a water/solvent ratio comprised between about 3:1 and about 1:2.

5. The process of claim 1, wherein step (ii) further comprises washing the organic phase with deionized water prior to the filtration step (iii) to remove residual traces of electrochemically active material.

6. The process of claim 1, the process further comprising, before step (i), steps of washing the electrode material using a solvent to obtain a suspension of graphene and electrochemically active material, and of filtering of said suspension.

7. The process of claim 6, wherein the washing step further comprises treating the suspension in an ultrasonic bath.

8. The process of claim 6, further comprising an additional washing step with a solvent after the filtration step.

9. The process of claim 1, further comprising, before step (i), a thermal treatment step performed at a temperature of between about 400° C. and about 550° C. for at least 20 minutes.

10. The process of claim 9, wherein the thermal treatment is carried out at a temperature of about 500° C. and for a period of time of between 20 and 60 minutes.

11. The process of claim 9, further comprising a pre-drying step before the thermal treatment step.

12. The process of 11 claim 1, wherein the electrochemically active material is selected from TiO$_2$, Li$_2$TiO$_3$, Li$_4$Ti$_5$O$_{12}$, H$_2$Ti$_5$O$_{11}$ and H$_2$Ti$_4$O$_9$, or a combination thereof, LiM'PO$_4$ wherein M' is Fe, Ni, Mn, Co, or a combination thereof, LiV$_3$O$_8$, V$_2$O$_5$, LiMn$_2$O$_4$, LiM"O$_2$, wherein M" is Mn, Co, Ni, or a combination thereof, Li(NiM''')O$_2$, wherein M''' is Mn, Co, Al, Fe, Cr, Ti, or Zr, and combinations thereof.

13. The process of claim 1, wherein the electrochemically active material is a lithium titanate or a lithium metal phosphate.

14. The process of claim 13, wherein the electrochemically active material is Li$_4$Ti$_5$O$_{12}$, LiFePO$_4$, or carbon-coated LiFePO$_4$.

15. The process of claim 1, further comprising steps of separating the aqueous phase and of regenerating the electrochemically active material.

* * * * *